United States Patent [19]
Goldberg et al.

[11] 3,771,065
[45] Nov. 6, 1973

[54] TUNABLE INTERNAL-FEEDBACK LIQUID CRYSTAL-DYE LASER

[75] Inventors: Lawrence S. Goldberg, Alexandria; Joel M. Schnur, Springfield, both of Va.

[73] Assignee: The United States of America as represented by the Secretary of the Navy, Washington, D.C.

[22] Filed: Aug. 9, 1972

[21] Appl. No.: 279,162

[52] U.S. Cl. ...... 331/94.5 L, 252/301.2 R, 252/408, 350/160 LC, 331/94.5 C
[51] Int. Cl. ............................................. H01s 3/00
[58] Field of Search ............. 331/94.5 C, 94.5 L; 350/160 LC; 252/301.2 R, 408

[56] References Cited
UNITED STATES PATENTS
3,627,408  12/1971  Fergason ............... 350/160 LC X
3,726,584  4/1973  Adams et al. ............ 350/160 LC X

OTHER PUBLICATIONS

Shank et al., "Tunable Distributed-Feedback Dye Laser", Applied Physics Letters, Vol. 18, pp. 395–396, May 1, 1971

Primary Examiner—Edward S. Bauer
Attorney—R. S. Sciascia et al.

[57] ABSTRACT

A liquid lasing medium having internal distributed feedback by virtue of the molecular structure of a cholesteric liquid crystal material, said medium comprising a mixture of a strongly fluorescent dye, 7-diethyl-4-methyl coumarin, and a cholesteric liquid crystal solution of 40 percent cholesteryl oleyl carbonate, 30 percent cholesteryl chloride and 30 percent cholesteryl monanoate.

6 Claims, 2 Drawing Figures

PATENTED NOV 6 1973     3,771,065

TUNABLE INTERNAL-FEEDBACK LIQUID CRYSTAL-DYE LASER

BACKGROUND OF THE INVENTION

This invention relates to lasers and especially to lasers utilizing a mixture of a fluorescent dye and a cholesteric liquid crystal as the lasing medium.

A need exists at the present time for a compact source of coherent monochromatic light that may be tuned at will. Such light could be used in the following areas:
1. Spectroscopy
   a. Spectrophotometry
   b. Excitation spectroscopy
2. Multi-color display and projection system
3. Multiwavelength-channel communications source A tunable distributed-feedback dye laser has been demonstrated. The internal feedback in this device arises from backward Bragg scattering produced in the lasing medium by introducing a spatial variation of refractive index or gain. This is accomplished by pumping the dye with the fringes formed by the interference of two coherent beams. Spectral tuning is achieved by varying the angle at which the two pump beams interfere in order to change the periodicity of the fringes. The device requires a coherent (single-frequency) pump laser and a relatively complex system of mirrors to align the two interfering beams and to change the angle between them for tuning.

BRIEF SUMMARY OF THE INVENTION

The objects and advantages of the present invention are obtained by utilizing as a liquid lasing medium a mixture of a fluorescent dye and a cholesteric liquid crystal which provides internal distributed feedback for the lasing light without the use of a mirror system.

An object of this invention is to provide internal distributed feedback (i.e., mirrorless feedback) for a dye laser.

Another object is to provide an easily tunable dye laser.

Other objects, advantages and novel features of the invention will become apparent from the following detailed description of the invention when considered in conjunction with the accompanying drawings wherein:

DETAILED DESCRIPTION OF THE INVENTION

Figure 1:
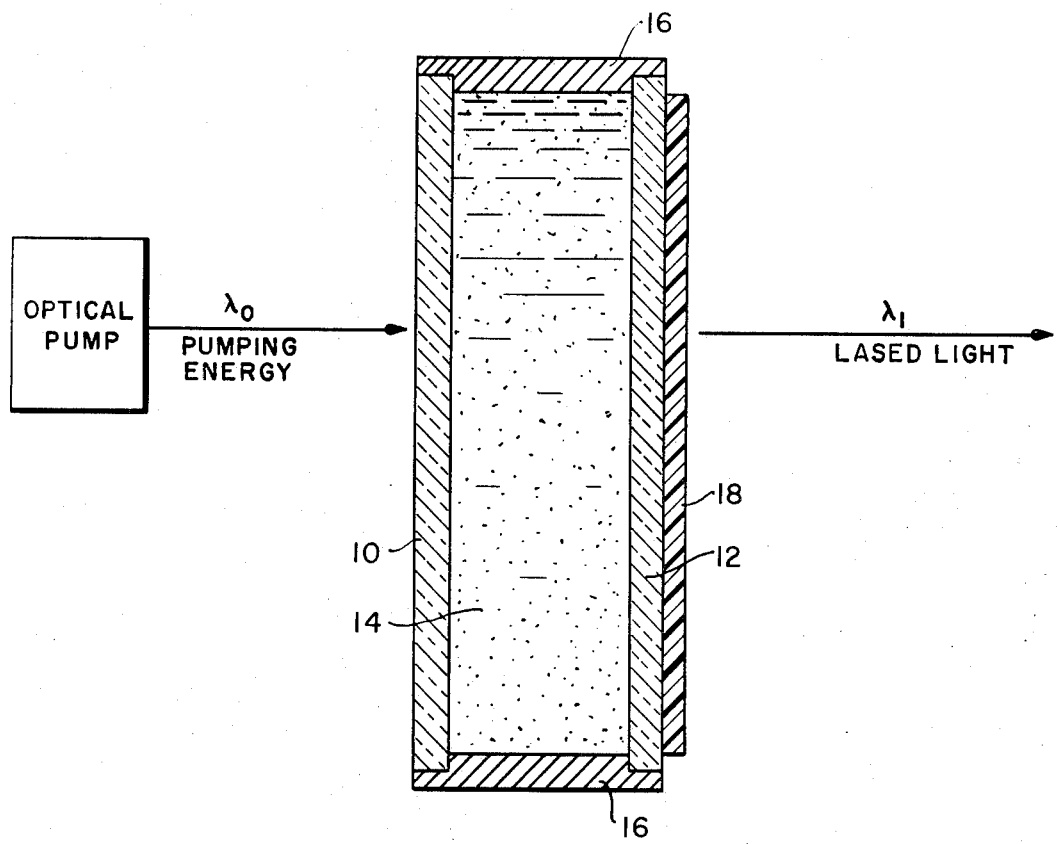
FIG. 1 is a cross-sectional schematic illustration of an embodiment of the invention.

The figure shows, in cross-sectional view, an embodiment of the invention comprising a pair of supporting, spaced glass plates 10 and 12 separated by a thin film 14 of liquid, the plates being bounded by a liquid seal 16 such as a teflon O-ring. A light-blocking filter 18 is attached to the outside of one of the glass plates 12. The spacing of the plates 10 and 12 may, perhaps, be some 25–1,000 microns.

The liquid between the glass plates is the lasing medium and comprises a mixture of a strongly fluorescent dye, such as 7-diethyl-4-methyl coumarin, and a cholesteric liquid crystal. The latter may, for example consist of 40 percent cholesteryl oleyl carbonate, 30 percent cholesteryl chloride and 30 percent cholesteryl nonanoate.

The dye is pumped with light at its absorbing wavelength $\lambda_o$, which is about 3,400 A, and emits light in a band centered at a wavelength $\lambda_1$ of about 4,500 A. Pumping source may, for example, be a nitrogen laser. The light-blocking filter 18 transmits light at a wavelength of $\lambda_1$ and blocks out light at a wavelength of $\lambda_o$, so that only lased light passes out of the device.

The system lases with circularly polarized output at wavelength $\lambda_1$ as a result of the internal reflection from the periodic molecular structure of the cholesteric liquid crystal material. Lasing occurs in the direction normal to the plane of the supporting glass plates. The wavelength of internal reflection is adjusted to overlap the fluorescent band of the dye by adjusting the pitch distance of the internal helical molecular structure. This pitch distance has been found to lie in the range of 3,000 to 15,000 A. and has been found to be a function of temperature, electric field, pressure and composition.

Figure 2:
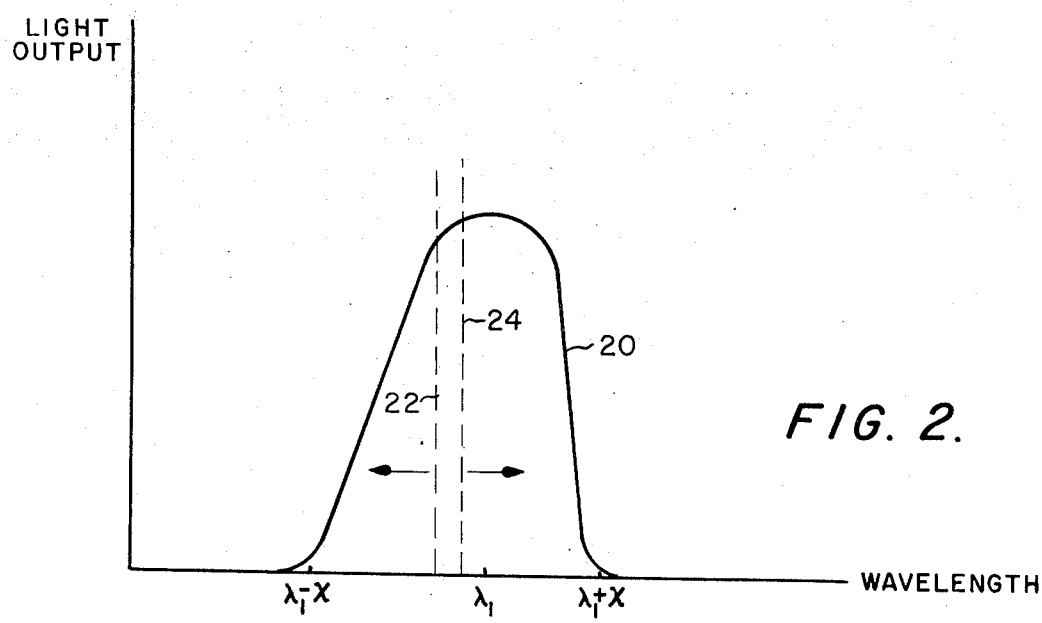
FIG. 2 is an illustration of the light-output v. wavelength characteristic of the lasing medium.

Thus, in FIG. 2, which shows the fluorescent light output from the dye in terms of wavelength (curve 20), the lased-light output lies between the dotted lines 22 and 24 which might, for example, be a few A. or less wide. This region can be tuned, that is, moved to the right or to the left (as indicated by the arrows) either by changing the temperature of the lasing liquid or by applying a d.c. electric field across the liquid and varying the voltage between 100 and 1,000 volts, for example.

To make the device efficient, the surfaces of the supporting glass plates must be highly polished and cleaned to give the dye-cholesteric solution a homogeneous, non-scattering texture. This involves preparation techniques such as cleaning with chromic acid and drying in water-free atmosphere, for example.

The device can be used in spectroscopy as a tunable source of circularly polarized light. The compact thin-film form of the lasing medium makes the device useful as a multicolor display and projection system. Films can be arranged in single units or multiple units emitting different primary colors, and can be separately addressed or tuned at various spatial positions by external means. The device can be used as a compact multi-wavelength-channel communications source, as a remote temperature sensor by projection of color changes, and other applications requiring a tunable light source.

Other fluorescent dyes may also be employed as shown in the following table to change the laser output center wavelength.

| Organic Component | Laser Output Center Wavelength (A) |
|---|---|
| BBO or 2,5-dibiphenylyloxazole | 4100 |
| Bis-MSB or p-bis(O-methylstyryl)-benzene | 4200 |
| POPOP or p-bis [2-(5-phenyloxazolyl)] benzene | 4300 |
| Acridine | 4370 |
| 7-Diethyl-4-methyl coumarin | 4500 |
| 3-Aminophthalimide | 5000 |
| Pyronin B | 5760 |
| 3,3'-Diethyloxadicarbocyanine iodide | 6580 |

Obviously many modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. In a laser, a liquid lasing medium comprising a mixture of:
   a fluorescent dye and
   a cholesteric liquid crystal.

2. A liquid lasing medium as in claim 1, in which: said dye comprises the material 7-Diethyl-4-methyl coumarin.

3. A liquid lasing medium as in claim 1, in which: said cholesteric liquid crystal comprises a solution formed from 40 percent cholesteryl oleyl carbonate, 30 percent cholesteryl chloride and 30 percent cholesteryl nonanoate.

4. In a laser, a liquid lasing medium comprising a mixture of: injecting fluorescent dye means for absorbing radiant energy of one wavelength and emitting light of a different wavelength;
   cholesteric liquid crystal means for providing internal distributed feedback for the lasing light.

5. A medium as in claim 4, wherein said fluorescent dye means comprises 7-Diethyl-4-methyl coumarin.

6. A medium as in claim 4, wherein said liquid means for providing internal distributed feedback comprises a solution of 40 percent cholesteryl oleyl carbonate, 30 percent cholesteryl chloride, and 30 percent cholesteryl nonanoate.

* * * * *